United States Patent [19]
Ohtomo et al.

[11] Patent Number: 5,475,049
[45] Date of Patent: Dec. 12, 1995

[54] RESIN COMPOSITION

[75] Inventors: Takashi Ohtomo, Utsunomiya; Hiromi Ishida, Moka; Hidekazu Kabaya, Moka; Hiroshi Kubo, Moka, all of Japan

[73] Assignee: General Electric Company, Pittsfield, Mass.

[21] Appl. No.: 149,255

[22] Filed: Nov. 9, 1993

[30] Foreign Application Priority Data

Nov. 9, 1992 [JP] Japan ................... 4-322264

[51] Int. Cl.$^6$ ............... C08J 5/10; C08K 3/34; C08L 71/12
[52] U.S. Cl. ............ 524/449; 524/447; 524/451; 524/494
[58] Field of Search ............ 525/397; 524/449, 524/447, 451, 434, 494, 437, 439

[56] References Cited

U.S. PATENT DOCUMENTS 5,091,461  2/1992  Skochdopole ............ 524/493

FOREIGN PATENT DOCUMENTS

| | | |
|---|---|---|
| 0183195 | 11/1985 | European Pat. Off. . |
| 0375177 | 6/1990 | European Pat. Off. . |
| 0381056 | 8/1990 | European Pat. Off. . |
| 0422495 | 4/1991 | European Pat. Off. . |
| 4088058 | 3/1992 | Japan . |

*Primary Examiner*—Paul R. Michl
*Assistant Examiner*—U. K. Rajguru

[57] ABSTRACT

Resin composition comprising 8–10 parts by weight of a polyphenylene ether resin, 90–20 parts by weight of a polyamide resin, and 30–70 parts by weight, per 100 parts by weight of the polyphenylene ether resin and the polyamide resin combined, of a plate or flake like inorganic filler wherein the inorganic filler has an average particle size of no more than 5 μm and as aspect ratio of no less than 3 and wherein the difference between the crystallization initiation temperature of a composition comprising 90 weight percent polyamide and 10 weight percent of the inorganic filler and the crystallization initiation temperature of the polyamide resin is 5° C. or less. The resin compositions have excellent surface smoothness, high rigidity, a small linear expansion coefficient, and good impact resistance, heat resistance and chemical resistance.

22 Claims, No Drawings

RESIN COMPOSITION

FIELD OF THE INVENTION

This invention relates to resin compositions which contain a polyphenylene ether resin (hereinafter abbreviated as PPE) and a polyamide resin (hereinafter abbreviated as PA). More specifically, they relate to thermoplastic resin compositions suitable for producing blow-molded products having excellent surface smoothness and excellent brilliance after painting.

DESCRIPTION OF RELATED ART

Resin compositions composed of polyphenylene ether resins and polyamide resins have excellent heat resistance, moldability, oil resistance and resistance to organic solvents. Moreover, because resin compositions which also contain elastomers are additionally endowed with an excellent impact resistance, they are used in automotive components, electrical and electronic components, and machine components. In particular, given that these resin compositions can be painted "on-line," it is expected that they will be used in automotive exterior trim components.

In order for resin compositions to be used in exterior trim components in automobiles, and in particular outer panels, moldings, bumpers, spoilers and the like, given the problems associated with the attachment of these components to other members and especially to metal materials, one requirement has been that the low linear expansion coefficient of the resin composition be lowered. It is known that powdered or flake-like inorganic fillers such as calcium carbonate, talc and mica, and fibrous fillers such as glass fibers, carbon fibers and potassium titanate whiskers are blended in so as to lower the linear expansion coefficient of thermoplastic resins. Fibrous reinforcing agents such as glass fibers and carbon fibers are especially effective for enhancing strength and rigidity, and for lowering the linear expansion coefficient. Of these, glass fibers are inexpensive and are widely used as reinforcing materials, but their use results in a poor surface appearance and impact resistance. In particular, irregularities due to the glass fibers form on the surface, which gives rise to the fatal drawback in exterior trim components of a decrease in brilliance when painted. Attempts to resolve drawbacks such as these have been made using slender glass fibers (e.g., Japanese Published Unexamined Patent Application [Kokai] No. 4-146,959 (1992)), but these glass fibers are expensive, in addition to which the resulting impact resistance is inadequate. Whiskers such as potassium titanate whiskers are finer than glass fibers and carbon fibers, in addition to which they have a high aspect ratio. Hence, they provide the composition with an excellent surface appearance, mechanical strength, and impact resistance, However, they are expensive. In addition, the problem of asbestos fiber carcinogenicity has led to recent reports on carcinogenicity attributable to the shape of fibrous materials (the Stanton-Port hypothesis; see, for example, *J. Natl. Cancer Int.* 58, 587–603 (1977); *J. Natl. Cancer Int.* 67, 965–975 (1981); *Proc. WHO/IRAC Conf.* 1982, No. 2, 286–302 (1984); "All about asbestos substitutes," *Nihon Katlkyo Sentaa Kanshu*, 211–284 (1989), and so there are problems with these as well from the standpoint of safety and hygiene. In addition, because fibrous fillers readily break, when recycled, a substantial loss occurs in their reinforcing effects.

Where use in automobile exterior trim members is intended, reduction in the weight of the components is one important topic that must be taken into consideration. One method for achieving weight reduction that is effective from the standpoint of the fabrication method is blow molding. By making the product hollow, it is possible to counteract the increase in weight of the overall molded product due to the inclusion of fillers.

However, up until now, most resin compositions that consist of polyphenylene ether resins and polyamide resins are for injection molding; there are few polymer alloys suitable for blow molding. When a polyamide resin is blended in a-polyphenylene ether resin, the fluidity of the molten resin composition increases and the parison prior to flowing sags under its own weight, resulting in drawdown, a phenomenon whereby the wall thickness and the dimensions of the molded product become extremely irregular. Hence, it has been difficult to carry out blow molding using resin compositions obtained by blending polyamide resins in polyphenylene ether resins, and it has been almost impossible to obtain large hollow molded products in particular. Moreover, even should this be possible, molded products having a uniform wall thickness cannot be obtained. Because the molding temperature is high (260° C. or more), deterioration products are formed due to residence of the resin within the extruder, accumulator or near the die; this tends to cause defects in appearance such as surface irregularities and die lines to arise.

Techniques that have been developed as attempts to help resolve the problem of parison drawdown include methods involving the joint use of acid-modified polyolefins and polyamides in which the amount of terminal amino groups is greater than the amount of terminal carboxyl groups (Kokai No. 63-175,062 (1988), and methods whereby an alkenyl aromatic compound-conjugated diene copolymer and an $\alpha,\beta$-unsaturated carboxylic acid-modified polyolefin are blended (Kokai No. 4-7358). By incorporating these methods, parison drawdown in resin compositions made of polyphenylene ether resins and polyamide resins has been improved, and the blow moldability has been greatly enhanced. However, this improvement has not gone so far as to resolve external defects such as surface irregularities and die lines. In those cases in particular where fillers have been blended, it has not been possible to obtain molded products having an excellent surface smoothness. For example, because whiskers such as potassium titanate fibers and titanium oxide needles (which provide resin moldings that have an excellent surface appearance when the composition is injection molded) are extremely fine and have a high aspect ratio, the whiskers tend to entangle with each other; as a result, even when they are worked into the resin, they do not fully open and tend to end up becoming clumps and remaining as such. For this reason, in blow molding at a low molding pressure, irregularities tend to arise on the surface due to these clumps, which promotes surface defects.

SUMMARY OF THE INVENTION

The object of this invention is to provide thermoplastic resin compositions for blow molding which have an excellent surface smoothness ideal for automotive exterior trim components in which brilliance after painting is required, and which also have a high rigidity, a small linear expansion coefficient, and a good impact resistance, heat resistance, and resistance to chemicals.

This invention is a resin composition containing:

(A) 10–80 parts by weight of a polyphenylene ether resin, (B) 90–20 pans by weight of a polyamide resin, and (C) 3–70 parts by weight, per 100 parts by weight of the total of (A) and (B) above, of a plate-like (flake-like) inorganic filler, whereby (1) the average particle size is no more than 5 μm and the aspect ratio is at least 3, and (2) ΔT is 5° C. or less (where $\Delta T = T_{pA/Filler} - T_{pA}$; $T_{pA}$ being the crystallization initiation temperature of said polyamide resin, and $T_{pA/Filler}$ being the crystallization initiation temperature of a composition comprising 90 wt % of said polyamide resin and 10 wt % of said inorganic filler).

The inventors conducted intensive studies aimed at developing thermoplastic resin compositions having the above properties. As a result, they found that by blending inorganic fillers with specific properties that have a small polyamide resin crystallization-promoting effect (nucleating agent effect) on thermoplastic resins composed of polyphenylene ether resins and polyamide resins, these fillers suppress the rise in the crystallization initiation temperature of the thermoplastic resin, greatly enhance the surface transferability at the time of blow molding, and are able to impart excellent surface smoothness, in addition to which they can also confer a high rigidity, a low linear expansion coefficient, and a good impact resistance, heat resistance and chemical resistance. This discovery ultimately led to the present invention.

In the crystalline resin of injection-molded products, it is a common practice to accelerate the crystallization rate, and thus the crystallization initiation temperature, by including a crystal nucleating agent in order to shorten the molding cycle. Conversely, the greatest feature of the present invention is to keep this crystallization initiation temperature from increasing as much as possible. By suppressing an increase in the crystallization initiation temperature, the parison is extruded from the accumulator, the mold is closed, blowing is carried out, and solidification of the resin proceeds relatively slowly during the cooling process up until the time that the resin composition is transferred to the shape of the mold. Hence, even if a little foreign matter such as the products of resin deterioration does float out onto the parison surface, because the resin is blown onto the mold before it completely solidifies, this foreign matter becomes embedded without forming gaps with the mold. As a result, the surface of the molded product becomes smooth. When the crystallization initiation temperature becomes high, solidification of the resin rapidly proceeds; hence, transfer to the surface of the mold often occurs after solidification of the surface layer has already begun. In such cases, traces of microdefects due to the foreign matter that has floated to the parison surface remain, causing the surface smoothness of the molded product to worsen. This effect cannot be countered without the use of special high-speed, high mold temperature, high-pressure blow extruders.

The inorganic filler serving as component (C) in this invention is characterized in that:

(1) it is a plate-like (flake-like) filler having an average particle size of no more than 5 μm, and preferably no more than 4 μm, and an aspect ratio of at least 3, preferably at least 5, and most preferably at least 10; and (2) the difference ΔT ($= T_{pA/Filler} - T_{pA}$) between the crystallization initiation temperature ($T_{pA/Filler}$) of the composition according to this invention comprising 90 wt % of polyamide resin and 10 wt % of the above-mentioned inorganic filler, and the crystallization initiation temperature ($T_{pA}$) of the polyamide resin alone is no more than 5° C., and preferably no more than 3° C.

When the average particle size of the inorganic filler exceeds 5 μm, the reinforcing effects increase, but surface irregularities become coarser, which has an adverse influence on the brilliance after painting. When the aspect ratio is less than 3, the reinforcing effects diminish, the rigidity decreases, and the linear expansion coefficient does not become small, which is undesirable. Furthermore, when the temperature difference ΔT exceeds 5° C., the surface transferability during blow molding worsens markedly, which is undesirable. Here, the aspect ratio of the inorganic filler indicates the particle diameter/thickness.

The above-described crystallization initiation temperature can be measured using a differential scanning calorimeter. That is, after the sample has been heated once to a temperature of at least the predicted melting point, when the sample temperature then drops at a fixed rate of 50° C. per minute, for example, a crystallization peak that accompanies polyamide resin crystallization appears. The temperature of the rising portion of this crystallization peak is taken as the crystallization initiation temperature. The crystallization initiation temperature of a composition composed of polyamide resin and the inorganic filler is generally measured for a composition comprising 90 wt % of polyamide resin and 10 wt % of inorganic filler. In compositions in which the range in the amount of polyamide resin is 97–50 wt %, and the range in the amount of inorganic filler is 3–50 wt %, the above-described crystallization initiation temperature is essentially constant.

Inorganic fillers that satisfy the above-described properties (1) (i.e., average particle size, 5 μm or less; aspect ratio, 3 or more) can be obtained by grinding and/or sifting, and converting into fine particles, inorganic fillers having an intrinsically plate-like (flake-like) structure such as kaolinite, talc, and micas (e.g., sericite, muscovite and phlogopite); sheet-like clay minerals such as chlorite, montmorillonite and halloysite; or synthetic plate like fillers such as glass flakes and metal plate-like particles (e.g., gold).

Normally, when a filler having the above-described properties (1) is added to a crystalline resin, due to the effects of the nucleating agent, the crystallization initiation temperature generally tends to rise quite a bit. For example, talc is well known as a filler having a high nucleating agent effect. It acts in the same way with respect to polyamide resins, causing a rise of more than 20° C. in the crystallization initiation temperature.

The inventors thus carefully measured the influence of fillers on the crystallization initiation temperature of polyamide resins using a differential scanning calorimeter, as a result of which they found that the nucleating agent effect is suppressed by firing or surface treating a filler having a high nucleating agent effect, such as talc, and that when this is used in PPE/PA compositions, blow-molded products having an excellent surface smoothness and an excellent brilliance after painting can be obtained. This is thought to be due to a loss in the surface activity of the filler on account of the firing or surface treatment. Hence, the inorganic filler is able to satisfy the second property; i.e., the condition that ΔT be no more than 5° C. Because the above-mentioned micas satisfy the second property without requiring any special treatment, they may be used directly without modification.

The above-described firing treatment may consist, for example of 1–4 hours of heat treatment at 500°–800° C. using a heating oven. Examples that may be cited of the surface treatment agent include silane coupling agents, titanate coupling agents, and silicone oils, although the possibilities are not limited to these only. The use of silane coupling agents is preferable because they enhance adhesion with the resin. Specific examples that may be cited include γ-glycidoxypropyltrimethoxysilane, β-(3,4-epoxycyclohexyl)ethyltrimethoxysilane, vinyltriethoxysilane, vinyltris(2-methoxyethoxy)silane, γ-methacryloxypropyltrimethoxysilane, γ-aminopropyltrimethoxysilane, N-β-(aminoethyl)-γ-aminopropyltrimethoxysilane, N-β-(aminoethyl)-γ-aminopropylmethyldimethoxysilane, γ-mercaptopropyltrimethoxysilane, and γ-chloropropyl-trimethoxysilane. Examples of surface treatment methods that may be cited include a method whereby the filler is dipped in an aqueous solution or an aqueous dispersion containing 0.01–1 wt % of a surface treatment agent, and 1–2 hours of heat treatment is carried out at a temperature of 140°–150° C.; and a method whereby the above surface treatment agent and the filler are stirred and mixed in a super mixer.

When one takes into account the cost of grinding treatment and the cost of filler, the use of talc and micas is preferable.

A known resin can be used as the polyphenylene ether resin (PPE) employed in this invention as Component (A). Here, "polyphenylene ether resin" refers to polymers having the formula

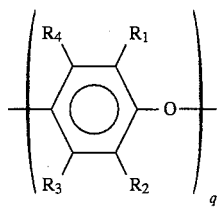

(where $R_1$, $R_2$, $R_3$ and $R_4$ are monovalent substituents which are each independently selected from hydrogen atoms, halogen atoms, alkyl groups, alkoxy groups, and haloalkyl groups or haloalkoxy groups having at least two carbons between the halogen atom and the phenyl ring, and which do not contain any tertiary α-carbons; and q is an integer indicating the degree of polymerization); this may consist of just one polymer having the above formula, or it may be a copolymer in which two or more of these polymers have been combined. In preferable examples, $R_1$ and $R_2$ are alkyl groups with 1–4 carbons, and $R_3$ and $R_4$ are hydrogens or alkyl groups with 1–4 carbons. Examples that may be cited include poly(2,6-dimethyl-1,4-phenylene)ether, poly(2,6-diethyl-1,4-phenylene)ether, poly(2-methyl-6-ethyl-1,4-phenylene)ether, poly(2-methyl-6-propyl-1,4-phenylene)ether, poly(2,6-dipropyl-1,4-phenylene)ether and poly(2-ethyl-6-propyl-1,4-phenylene)ether. Examples that may be cited of PPE copolymers include copolymers which contain some alkyl tri-substituted phenols such as 2,3,6-trimethylphenol among the above polyphenylene ether repeating units. Moreover, these PPE copolymers may be copolymers in which styrene compounds have been grafted. Examples of styrene compound-grained polyphenylene ethers include the copolymers obtained by the graft polymerization of a styrene compound such as styrene, α-methylstyrene, vinyltoluene and chlorostyrene onto the above-described PPE.

In this invention, in order to promote the compatibility of the PPE with the polyamide resin, PPEs in which the PPE end groups have been modified with groups that react with amino groups, such as epoxy groups, carboxyl groups or acid anhydrides, cad be used in place of part or all of the abovedescribed PPE. The conversion of PPE end groups to epoxy, carboxyl or acid anhydrides can be carried out by a known process.

The epoxidation of end groups is described, for example, in Kokai No. 63-125,525 (1988). Terminal-epoxidized PPE can be obtained by contacting PPE and an epoxy group-bearing substance under heating. The compounds having epoxy groups may be epoxy compounds in which one end group is a halogen or epoxy groups in which both end .groups are epoxy groups. Preferable examples of compounds that have been epoxidized on one end include epichlorohydrin and 2-methylepichlorohydrin. Preferable examples of compounds that have been epoxidized on both ends include 2,2-bis(4-glycidylphenyl ether)propane and epoxy resin. A compound that has been epoxidized on one end is especially desirable from the standpoint of inhibiting blocking between PPE [surfaces].

With regard to conversion of the end group into a carboxyl group or an acid anhydride, PPEs having end groups that have been converted to carboxyl groups or to an acid anhydride are obtained by reacting PPE with an acid chloride having carboxyl groups or which is an acid anhydride (e.g., trimellitic acid anhydride chloride).

All the end groups in the above-described end group-modified PPE need not necessarily be modified, it being preferable, for instance, that unmodified end groups be included in an amount of 70 wt % or less based on the total amount of PPE in component (A).

The polyamide resin serving as component (B) used in this invention contains —CO—NH— bonds on the polymer main chain and can be melted by heating; moreover, this exhibits a distinct melting point having a measurable heat of fusion. The melting point and the heat of fusion can be measured using a differential scanning calorimeter. Using this device, the heat of fusion can be measured, for example, at a rate of temperature rise of 10° C. per minute. That is, the heat of fusion can be measured by heating the sample to a temperature of at least the predicted melting point, raising the temperature of the sample at a rate of 10° C. per minute, cooling to 30° C. and letting the sample stand [at this temperature] for about one minute, then heating at a rate of 10° C. per minute. Even when the heat of fusion is measured in one of the temperature rise and temperature fall cycles after the first cycle, a value that becomes constant within the range of experimental error is employed.

Examples of crystalline polyamide such as these that may be cited include nylon 4, nylon 6, nylon 12, nylon 6,6, nylon 4,6, nylon 6,10, nylon 6,12, nylon 6,T (a polyamide composed of hexamethylenediamine and terephthalic acid), nylon MXD,6 (a polyamide composed of m-xylylenediamine and adipic acid), mixtures of nylon 6 and nylon 6,6, and copolymers of hexamethylenediamine, adipic acid and caprolactam. Of these, the use of aliphatic polyamide polymers is preferable, with the use of nylon 6,6 and nylon 6 being especially preferable. The [crystalline polyamide] used may be a commercial product.

In order to avoid drawdown of the parison in blow molding, it is desirable to increase the melt viscosity by using a polyamide in which the amount of terminal amino groups is greater than the amount of terminal carboxyl groups. This type of polyamide can be obtained by adding, at the time of polyamide polymerization, an excess of a compound such as a diamine having groups that react with carboxyl groups. Alternatively, following polymerization of the polyamide, this can be obtained by reacting the polyamide with a compound having groups that react with carboxyl groups. It is even more desirable to use the acid-modified polyolefin resin in combination with this polyamide. In this way, the shear rate dependence of the resin composition melt viscosity becomes high, as a result of which the melt viscosity at high shear rates becomes low and the melt viscosity at low shear rates becomes high, thereby substantially enhancing the blow moldability. Acid-modified polyolefin resins such as this are copolymers of one or more alkylene monomers such as ethylene and propylene with one or more unsaturated dicarboxylic acids or their derivatives; these may be, tier example, block copolymers, graft copolymers or random copolymers. Examples of the unsaturated carboxylic acids that may be cited are acrylic acid, methacrylic acid, maleic acid and fumaric acid; derivatives of unsaturated carboxylic acids that may be cited include amides, imides, esters, metal salt compounds and acid anhydrides.

In order to promote greater compatibility between PPE and polyamide, compatibilizing agents for both of these can also be added to the resin compositions of this invention. Examples of such compatibilizing agents that may be used include the unsaturated carboxylic acids and their derivatives cited in Kokai No. 56-26,9 13 (1981), and saturated aliphatic polycarboxylic acids and their derivatives cited in Tokuhyo No. 61-502,195 (198).

The unsaturated carboxylic acids and their derivatives referred to above are compounds that contain within the molecule:

(a) carbon-carbon double or triple bonds, and (b) carboxyl groups, acid anhydride groups, acid amide groups, imide groups, carboxylic acid ester groups or epoxy groups.

Examples of these compounds that may be cited include maleic anhydride, maleic acid, fumaric acid, maleimide, maleic hydrazide, the reaction products of maleic anhydride and diamines, such as compounds having a structure represented by the following formulas

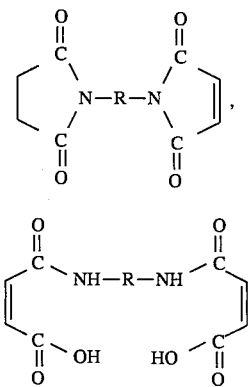

(where R represents an alicyclic group or an aromatic group), methylnadic anhydride, dichloromaleic anhydride and maleimide; natural oils and lipids such as soybean oil, tung oil, castor oil, linseed oil, flaxseed oil, cottonseed oil, sesame oil, rapeseed oil, peanut oil, camellia oil, olive oil, coconut oil and sardine oil; epoxidized natural oils and lipids such as epoxidized soybean oil; unsaturated carboxylic acids such as acrylic acid, butenoic acid, crotonic acid, vinylacetic acid, methacrylic acid, pentenoic acid, angelic acid, butyric acid, 2-pentenoic acid, 3-pentenoic acid, β-ethylacrylic acid, 13-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, icosenoic acid, docosenoic acid, erucic acid, tetracosenoic acid, "mycoripenic" acid, 2,4-pentadienoic acid, 2,4-hexadienoic acid, diallylacetic acid, geranium acid, 2,4-decadienoic acid, 2,4-dodecadienoic acid, 9,12-hexadecadienoic acid, 9,12-octadecadienoic acid, hexadecatrienoic acid, linoleic acid, linolenic acid, octadecatrienoic acid, icosadienoic acid, icosatrienoic acid, icosatetraenoic acid, ricinoleic acid, eleostearic acid, oleic acid, icosapentaenoic acid, erucic acid docosadienoic acid, docosatrienoic acid, docosatetraenoic acid, docosapentaenoic acid, tetracosenoic acid, hexacosenoic acid, hexacodienoic acid, octacosenoic acid and triacontenoic acid. Other examples that may be cited include the esters, acid amides and anhydrides of these unsaturated carboxylic acids; lower-molecular-weight polymers (e.g., with an average molecular weight of 500–10,000) or higher-molecular-weight polymers (e.g., with an average molecular weight of 10,000 or more) of butadiene, isoprene or the like to which maleic anhydride and phenols have been added, or in which carboxyl groups, epoxy groups or the like have been introduced.

The saturated aliphatic polycarboxylic acids and their derivatives cited above are the compounds represented by the formula $$(R'O)_m R^*(COOR'')_n (CONR'''R^{IV})_s$$

where $R^*$ is a straight-chained or branched saturated aliphatic hydrocarbon group having 2–20, and preferably 2–10, carbons; $R'$ represents hydrogen atoms or alkyl, aryl, acyl or carbonyldioxy groups (here, the number of carbon atoms is 1–10, preferably 1–6, and most preferably 1–4), with hydrogen atoms being especially preferable; $R''$ represents hydrogen atoms or alkyl or aryl groups (the number of carbon atoms here being 1–20, and preferably 1–10); and $R'''$ and $R^{IV}$ represent hydrogen atoms or alkyl or aryl groups (the number of carbon atoms here being 1–10, preferably 1–6, and most preferably 1–4); m=1; n+s≧2, with n+s preferably being 2 or 3, n≧0 and s≧0; and $(R'O)$ is situated at the α or β position of the carbonyl group; and where there are at least 2–6 carbons between the two carbonyl groups.

The reference to derivatives of saturated aliphatic polycarboxylic acids includes, for example, the ester compounds, amide compounds, anhydrides, hydrates and salts of saturated aliphatic polycarboxylic acids.

Examples of saturated aliphatic polycarboxylic acids that may be cited include citric acid, malic acid and agaric acid. Examples of acid ester compounds that may be cited include the acetyl ester and the mono- or distearyl esters of citric acid. Examples of acid amide compounds that may be cited include the N,N'-diethylamide, N,N'-dipropylamide, N-phenylamide, N-dodecylamide and N,N'-didodecylamide of citric acid, and the N-dodecylamide of malic acid. Examples of salts that may be cited include potassium and calcium salts.

The above-cited compatibilizing agents may be used alone or as combinations of two or more thereof.

The resin compositions of this invention can include rubbery substances as optional ingredients for further enhancing the impact resistance. These rubbery substances can be included in an amount of, for example, 70 parts by weight or less, per 100 parts by weight of component (A) and component (B) combined.

Rubbery substances include natural and synthetic polymer substances that are elastic bodies at room temperature.

Specific examples that may be cited include natural rubbers, butadiene polymers, styreneoisoprene copolymers, butadiene-styrene copolymers (including random copolymers, block copolymers and graff copolymers), isoprene polymers, chlorobutadiene polymers, butadiene-acrylonitrile copolymers, isobutylene polymers, isobutylene-butadiene copolymers, isobutylene-isoprene copolymers, acrylate polymers, ethylenepropylene copolymers, ethylene-propylenediene copolymers, Thiokol rubbers, polysulfide rubbers, polyurethane rubbers, polyether rubbers (e.g., polypropylene oxide) and epichlorohydrin rubbers.

These rubbery substances may be prepared by any polymerization method (e.g., emulsion polymerization, solution polymerization) and with any catalyst (e.g., peroxides, trialkyl aluminum, lithium halide, nickel-based catalysts). In addition, rubbery substances having various degrees of crosslinking, having microstructures in various ratios (e.g., cis structures, trans structures, and vinyl groups), and having various average rubber particle sizes may be used. The copolymers that can be used may be any type of copolymer, including random copolymers, block copolymers and graff copolymers. In addition, when preparing these rubbery substances, copolymerization with other monomers such as olefins, dienes, aromatic vinyl compounds, acrylic acid, acrylates and methacrylates is also possible. These copolymerization methods include any means, such as random copolymerization, block copolymerization and graft copolymerization. Examples of these monomers that can be cited include ethylene, propylene styrene, chlorostyrene, α-methylstyrene, butadiene, isobutylene, chlorobutadiene, butene, methyl acrylate, acrylic acid, ethyl acrylate, butyl acrylate, methyl methacrylate and acrylonitrile. In addition, partially modified rubbery substances can also be used; examples include hydroxy- or carboxy-terminal modified polybutadiene, partially hydrogenated styrene-butadiene block copolymers and partially hydrogenated styrene-isoprene block copolymers.

In this invention, the blending ratio of the PPE serving as component (A) and the polyamide resin serving as component (B) is 10–80 parts by weight of (A) with 90–20 parts by weight of (B), and preferably 15–60 pans by weight of (A) with 85–40 pans by weight of (B). When the amount of component (A) is less than 10 parts by weight, this is undesirable because not only does the heat resistance decrease, the dimensional stability also greatly decreases. On the other hand, when this amount exceeds 80 parts by weight, the improvement in the moldability and that solvent resistance is inadequate. The amount of inorganic filler used as component (C) is 3–70 parts by weight, and preferably 5–50 parts by weight, per 100 parts by weight of (A) and (B) combined. When the amount of component (C) is less than 3 parts by weight, the strength, rigidity, and linear expansion coefficient-improving effects are inadequate. Conversely, when this exceeds 70 pans by weight, dispersion within melt mixing devices becomes difficult, as a result of which both the fluidity and the surface appearance worsen. A great loss also occurs in the impact resistance.

In the resin compositions of this invention, various additives known to those acquainted with the art may be included other than the above-mentioned mixtures. Such additives include lubricants such as paraffin waxes and fatty acid esters, antioxidants such as hindered phenols, phosphates and phosphites; weather-resistance enhancers such as triazine-based compounds; colorants such as pigments and dyes; as well as flame retardants and antistatic agents. Of these, in order to increase the pinch-off strength of the blow-molded product, it is effective to include antioxidants. Examples of antioxidants that impart good results are hindered phenols and copper compounds, both of which are commonly used by those acquainted with the art. There is no particular limit on the copper compounds used, provided these can be uniformly blended in the resin composition; examples include copper halides such as copper iodide, cuprous chloride, cuptic chloride, cuprous bromide and cuptic bromide; the copper salts of organic acids, such as copper formate, copper acetate, copper propionate, copper stearate, copper oxalate, copper sebacate, copper lactate, copper benzoate and copper salicylate; the copper salts of inorganic acids, such as copper sulfate, copper phosphate and copper phosphite; as well as copper chelate compounds. The use of copper iodide and cuprous chloride or the like is preferable.

In addition, suitable use can be made of resins such as polystyrene, ABS, polyesters and polycarbonates in accordance with the intended aim.

There is no particular restriction on the method for producing resin compositions according to this invention, it being possible to make satisfactory use of a standard method. For example, this may be prepared by blending given amounts of components (A), (B), (C) and various types of added components that can be used-as desired, and kneading them in a kneader. Alternatively, these compositions can be prepared by feeding given amounts of components (A) and (B) as well as the addition components used as desired to an extruder and carrying out blending, then, after the resin has melted, side-feeding the inorganic filler serving as component (C), and kneading the composition. Yet another method that can be used consists of preparing a master batch by first blending component (B) and the inorganic filler serving as component (C) with an extruder, then side-feeding this into the mixture obtained by melt-kneading component (A), the rubbery substance and the addition substances used as desired. The kneader may be any device capable of kneading thermoplastic resins and inorganic fillers, with the use of an extruder, a Banbury mixer, or a kneader being especially desirable. Examples of such devices that can be used include screw extruders such as single-screw extruders and multiple-screw extruders, and non-screw extruders such as elastic extruders, hydrodynamic extruders, ram-type continuous extruders, roll-type extruders and gear-type extruders. Of these, screw extruders, and in particular, twin-screw extruders, are preferable.

Blow molding of the resin composition according to this invention is carried out according to a method known to those conversant with the art which can be suitably selected based on the capabilities of the blow molding machine and the shape of the molded products. Broad use can be made of methods hitherto known to those conversant with the art, such as blow molding, injection blow molding and stretch blow molding. That is, this may generally consist of first forming a parison, then blow molding at a suitable temperature using a conventional blow-molding machine.

This invention shall now be described more concretely by means of examples of the invention and comparative examples, although it shall be understood that these examples in no way restrict the scope of the invention.

(EXAMPLES)

First, crystallization initiation temperatures of compositions composed of various inorganic fillers and polyamide resins were measured. The surface treatment and firing of the inorganic fillers used was carried out as follows.

Phlogopite-2 (aminosilane): Prepared by adding 0.1 part by weight of aminosilane to 100 pans by weight of phlogopite, then mixing and stirring for 5 minutes in a supermixer.

Muscovite (fired): Prepared by firing at 600° C. for four hours.

Talc-1 (silicone oil): Prepared by adding 0.1 part by weight of silicone oil to 100 parts by weight of talc, then mixing and stirring for 5 minutes in a supermixer.

Talc-1 (fired): Prepared by firing at 600° C. for four hours.

Clay (fired): Prepared by firing at 600° C. for four hours.

The polyamide used was polyamide 6 (hereinafter, PA-6), which contained $8.1 \times 10^{-5}$ mole/gram of terminal amino groups and $3.6 \times 10^{-5}$ mole/gram of terminal carboxyl groups, and had a molecular weight of 13,000 and a melting point of 220° C. As shown in Table 1, 10 wt % of various inorganic fillers and 90 wt % of the above PA-6 were blended (this was carried out also in the case where 30 wt % of phlogopite was blended with 70 wt % of PA-6, and in the case where 45 wt % of talc-1 was blended with 55 wt % of PA-6). After kneading for 10 minutes at a temperature of 240° C. or less and a speed of 70 rpm using a "Laboplast" mill made by Toyo Seiki KK, the kneaded mixture was sampled. The crystallization initiation temperatures of the samples obtained here were measured red using a differential scanning calorimeter (Seiko Denshi Kogyo KK; SSC-5200H). First, the temperature was raised to 250° C. at a rate of 20° C./rain in a nitrogen atmosphere, then leer to stand at this level for one minute and the samples rendered into a molten state. The temperature was then lowered to room temperature at a rate of 50° C./min (temperature decrease rates of 20° C./min and 100° C./min were effected likewise for phlogopite-1). The above temperature rise, melting, and temperature drop operations were repeated again, and both the crystallization initiation temperature ($T_{PA/Filler}$) and the crystallization peak temperature ($T_{cp}$) were determined from the crystallization peak curve that appears at the time of the temperature decrease. The measurement results are given in Table 1. Using the same measurement [procedure] as that described above for the above-mentioned polyamide resin in which inorganic filler has not been blended, the crystallization initiation temperature ($T_{PA}$) was measured as 187° C.

As is apparent from Table 1, there is virtually no difference between the crystallization initiation temperatures of the polyamide resins in which micas, silicone oil-treated talc or fired talc were blended and the crystallization initiation temperatures of the polyamide resins alone. By contrast, the crystallization initiation temperatures of polyamide resin compositions in which untreated talc or clay has been blended were 10–20° C. higher than those for the polyamide resins alone. Moreover, one can see that, regardless of the amount of filler blended and the rate of decrease in the temperature, the crystallization initiation temperatures remain essentially the same.

Next, resin compositions composed of polyphenylene ether resins and polyamide resins in which the inorganic fillers shown in Table 1 had been blended were prepared. The compounds used in the examples were as follows.

Component (A): Polyphenylene ether resin (PPE)
  Poly(2,6-dimethyl-1,4-phenylene) ether having an intrinsic viscosity [η] (in 25° C. chloroform) of 0.48 dl/g.

Component (B): Polyamide resin
  The above-indicated P A-6.

Component (C): The inorganic fillers indicated in Table 1.

Compatibilizing agent: Citric acid
  Rubbery substance: Hydrogenated styrene-ethylene-butadiene-styrene copolymers (Shell Chemical: Kraton G1651) (abbreviated hereinafter as SEBS).
  Acid-Modified Polyolefin: Ethylene-ethyl acrylate-maleic anhydride terpolymers (Sumitomo CDF; "Bondine" FX8000)

Blends obtained by blending the various components in the amounts (parts by weight) indicated in Tables 2 and 3 were extruded at a temperature of 290° C. with a vacuum vented-twin-axis extruder, and pellets formed. At this time, the PPE, the compatibilizing agent, and the rubbery substance were fed from the throat portion, the various types of inorganic fillers were kneaded beforehand with PA-6 in an extruder (240° C.) and prepared as a master batch, following which this was fed from the side together with acid-modified polyolefin. The pellets thus obtained were dried and evaluated by means of the physical property tests, molding tests and product tests indicated in Table 4 and 5. The evaluation methods are described below.

TABLE 1

| Inorganic filler | Average particle size (μ)/ aspect ratio | Amount of filler blended (wt %) | Rate of temperature decrease (°C./min) | Crystallization initiation temperature (°C.) | Crystallization peak temperature (°C.) | ΔT (°C.) |
|---|---|---|---|---|---|---|
| (PA-6 alone) | — | — | 50 | 187 | 136 | — |
| Phlogopite-1 | 4/20 | 10 | 50 | 187 | 175 | 0 |
| " | " | " | 20 | 187 | 174 | 0 |
| " | " | " | 100 | 189 | 175 | 2 |
| Phlogopite-2 | 13/30 | 10 | 50 | 190 | 181 | 3 |
| Phlogopite-2 (aminosilane) | 13/30 | 10 | 50 | 187 | 178 | 0 |
| Muscovite | 4/15 | 10 | 50 | 188 | 178 | 1 |
| " | " | 30 | 50 | 189 | 177 | 2 |
| Muscovite (fired) | 4/15 | 10 | 50 | 187 | 176 | 0 |
| Talc-1 (silicone oil) | 1.7/10 | 10 | 50 | 190 | 182 | 3 |
| Talc-1 (fired) | 1.7/10 | 10 | 50 | 187 | 179 | 0 |
| Talc-1 | 1.7/10 | 10 | 50 | 211 | 187 | 24 |
| " | " | 45 | 50 | 213 | 188 | 26 |
| Talc-2 | 2.2/15 | 10 | 50 | 209 | 185 | 22 |
| Talc-1/Phlogopite-1 (1/1) | — | 5/5 | 50 | 205 | 183 | 18 |
| Clay | 2/<3 | 10 | 50 | 198 | 182 | 11 |
| Clay (fired) | 2/<3 | 10 | 50 | 189 | 176 | 2 |

ΔT: Difference between crystallization initiation temperature ($T_{PA/Filler}$) of composition comprising PA-6 and various inorganic fillers, and crystallization initiation temperature ($T_{PA}$) of PA-6 alone.

(1) Physical Properties:

Injection molding was carried out at a cylinder temperature of 270° C. and a mold temperature of 80° C. using the various types of pellets, and test pieces for the measurement of physical properties were thereby fabricated. Measurement of the physical properties was carried out by the following method.

Izod Impact Strength (NII): This was measured in accordance with ASTM D-256 using test pieces (notched) having a thickness of ⅛ inch.

Flexural Properties (Flexural Strength, FS; Flexural Modulus, FM): This was measured in accordance with ASTM D-790 using test pieces having a thickness of ¼ inch.

Heat Distortion Temperature (HDT): The heat distortion temperature was measured under a load of] 4.6 kg/cm² in accordance with ASTM D-648 using test pieces having a thickness of ¼ inch.

Linear Expansion Coefficient (CTE*): Test pieces measuring 20 mm in the lengthwise direction, 3 mm in width, and 3 mm in thickness were cut from ASTM No. I dumbbell tensile test pieces, and the percent change in dimensions from −30° C. to 80° C. was measured using a thermal stress-strain measuring device (Seiko Denshi Kogyo KK; TMA/SS 120C).

(2) Surface Appearance:

Box-like molded pieces having dimensions of 40×100×200 mm (wall thickness, 3 mm) were molded using a small blow-molding machine (The Japan Steel Works; JSW-JB105CP) at a temperature setting of 265° C., a screw rotational speed of 30 rpm, a blowing air pressure of 6 kg/cm², and a mold temperature of 100° C., 120° C. or 150° C.). After molding, the surface appearance of these moldings was examined. Square plates measuring 50×50 mm were cut out of these molded pieces and painted, following which the surface appearance was visually examined. The plates were evaluated on a scale of 1 to 5, with those plates having the best surface appearance receiving a grade of 5, and those plates having the worst appearance receiving a grade of 1.

(3) Crystallization Initiation Temperature:

Measurement was carried out under the same conditions as in Table 1, except that the temperature was raised to 280° C. in each case instead of 250° C.

Examples 1–5

Table 2 shows resin compositions according to this invention. The mold temperature of the blow-molding machine is 120° C. in Examples 1–4, and 150° C. in Example 5. Moldings having an excellent appearance were obtained in all these cases.

Comparative Examples

Table 3 shows comparative examples that do not use inorganic fillers and comparative examples that use inorganic fillers which do not accord with the present invention. The mold temperature of the blow-molding machine was 120° C. in Comparative Examples 1–3 and 5–7, and 150° C. in Comparative Example 4.

Comparative Example 1

Filler was not included this case. The surface appearance was excellent, but the rigidity was low and the linear expansion coefficient was large.

Comparative Example 2

Phlogopite-2 having an average particle size of 13μ was added as the filler. The rise in the crystallization initiation temperature was suppressed, but the appearance was poor—especially the appearance after painting.

Comparative Examples 3–5

Untreated talc-1 or talc-2 was used as the filler. Because the crystallization initiation temperature was high and the surface transferability at the time of blow molding was poor, the appearance was inferior. When the mold temperature was raised to 150° C. (Comparative Example 4), the surface transferability increased somewhat, yet remained inadequate.

Comparative Example 6

Equal weights of phlogopite-1 according to this invention and untreated talc-1 were both used as the fillers. Because the crystallization initiation temperature was high, the surface appearance was not good.

Comparative Example 7

Fired clay was used as the filler. The surface transferability was extremely good, but the reinforcing effects were poor and the linear expansion coefficient was large.

TABLE 2

| | Examples of the Invention | | | | |
|---|---|---|---|---|---|
| | 1 | 2 | 3 | 4 | 5 |
| PPE | 31 | 31 | 31 | 31 | 31 |
| Citric acid | 1 | 1 | 1 | 1 | 1 |
| SEBS | 10 | 10 | 10 | 10 | 10 |
| PA-6 | 35 | 35 | 35 | 35 | 35 |
| Acid-modified polyolefin | 3 | 3 | 3 | 3 | 3 |
| Phlogopite-1 | 20 | — | — | — | — |
| Muscovite-1 | — | 20 | — | — | — |
| Talc-1 (silicone oil) | — | — | 20 | — | — |
| Talc-1 (fired) | — | — | — | 20 | 20 |

TABLE 3

| | Examples of the Invention | | | | | | |
|---|---|---|---|---|---|---|---|
| | 1 | 2 | 3 | 4 | 5 | 6 | 7 |
| PPE | 31 | 31 | 31 | 31 | 31 | 31 | 31 |
| Citric acid | 1 | 1 | 1 | 1 | 1 | 1 | 1 |
| SEBS | 12 | 10 | 10 | 10 | 10 | 10 | 10 |
| PA-6 | 44 | 35 | 35 | 35 | 35 | 35 | 35 |
| Acid-modified polyolefin | 4 | 3 | 3 | 3 | 3 | 3 | 3 |
| Phlogopite-2 | — | 20 | — | — | — | — | — |
| Talc-1 | — | — | 20 | 20 | — | — | — |
| Talc-2 | — | — | — | — | 20 | — | — |
| Talc-1/Phlogopite-1 | — | — | — | — | — | 20 | — |
| Clay (fired) | — | — | — | — | — | — | 20 |

TABLE 4

| | Examples of the Invention | | | | |
|---|---|---|---|---|---|
| | 1 | 2 | 3 | 4 | 5 |
| Appearance of molding | 5 | 5 | 5 | 5 | 5 |
| Painting appearance | 5 | 5 | 5 | 5 | 5 |
| Crystallization initiation temperature (°C.) | 177 | 176 | 178 | 177 | 177 |

TABLE 4-continued

| | Examples of the Invention | | | | |
|---|---|---|---|---|---|
| | 1 | 2 | 3 | 4 | 5 |
| Crystallization peak temperature (°C.) | 165 | 166 | 166 | 168 | 168 |
| NII (kg.cm/cm) | 17 | 18 | 16 | 14 | 14 |
| FS (kg/cm$^2$) | 910 | 890 | 900 | 900 | 900 |
| FM (×10$^3$ kg/cm$^2$) | 36.5 | 34.3 | 36.0 | 37.0 | 37.0 |
| HDT (°C.) | 191 | 193 | 192 | 193 | 193 |
| CTE (1 × 10$^{-5}$/°C.) | 7.1 | 7.2 | 7.0 | 7.1 | 7.1 |

TABLE 5

| | Examples of the Invention | | | | | | |
|---|---|---|---|---|---|---|---|
| | 1 | 2 | 3 | 4 | 5 | 6 | 7 |
| Appearance of molding | 5 | 4 | 2 | 3 | 1 | 3 | 5 |
| Painting appearance | 5 | 3 | 1 | 3 | 1 | 2 | 5 |
| Crystallization initiation temperature (°C.) | 175 | 178 | 208 | 208 | 207 | 202 | 177 |
| Crystallization peak temperature (°C.) | 164 | 166 | 181 | 181 | 183 | 180 | 169 |
| NII (kg.cm/cm) | 68 | 10 | 11 | 11 | 7 | 12 | 25 |
| FS (kg/cm$^2$) | 790 | 960 | 930 | 930 | 1100 | 920 | 840 |
| FM (×10$^3$ kg/cm$^2$) | 19.8 | 39.0 | 38.0 | 38.0 | 43.0 | 37.2 | 24.0 |
| HDT (°C.) | 178 | 196 | 197 | 197 | 200 | 195 | 186 |
| (CTE (1 × 10$^{-5}$/°C) | 11.8 | 6.9 | 7.0 | 7.6 | 6.5 | 7.0 | 9.2 |

The resin compositions of this invention have excellent surface smoothness, a high rigidity, a small linear expansion coefficient, and good impact resistance, heat resistance and chemical resistance. Hence, they are ideal for use as automotive exterior trim components such as door handles, side moldings, fender panels, door panels, "garnishes" and bumpers.

We claim:

1. A resin composition comprising
   (A) 10–80 parts by weight of a polyphenylene ether resin,
   (B) 90–20 parts by weight of a polyamide resin, and
   (C) 3–70 parts by weight, per 100 parts by weight of the polyphenylene ether resin and polyamide resin combined, of a plate-like inorganic filler having an average particle size of no more than 5 μm and an aspect ratio of no less than 3;
   wherein the temperature difference between (i) the crystallization initiation temperature of a composition comprising 90 wt. % of the polyamide resin and 10 wt % of the inorganic filler and (ii) the crystallization initiation temperature of the polyamide resin is 5° C. or less.

2. A resin composition as recited in claim 1 wherein the average particle size is no more than 4 μm.

3. A resin composition as recited in claim 1 wherein the aspect ratio is no less than 5.

4. A resin composition as recited in claim 1 wherein the aspect ratio is no less than 10.

5. A resin composition as recited in claim 2 wherein the aspect ratio is no less than 5.

6. A resin composition as recited in claim 2 wherein the aspect ratio is no less than 10.

7. A resin composition as recited in claim 1 wherein the temperature difference is 3° C. or less.

8. A resin composition as recited in claim 1 wherein the inorganic filler is selected from the group consisting of fillers having plate-like structure, sheet-like clay minerals and synthetic plate-like fillers.

9. A resin composition as recited in claim 8 wherein the inorganic filler is selected from the group consisting of kaolinite, talc, micas, chlorite, moatmorillonite, halloysite, glass flakes and metal plate-like particles.

10. A resin composition as recited in claim 1 wherein the inorganic filler has a nucleating agent effect which has been suppressed by firing or surface treating the inorganic filler.

11. A resin composition as claimed in claim 1 wherein the polyamide resin is selected from the group consisting of nylon 4, nylon 6, nylon 12, nylon 6,6, nylon 4,6, nylon 6,10, nylon 6,12, nylon 6,T, nylon MXD,6, mixtures of nylon 6 and nylon 6,6, and copolymers of hexamethylenediamine, adipic acid and caprolactam.

12. A resin composition comprising
   (A) 10–80 parts by weight of a polyphenylene ether resin,
   (B) 90–20 parts by weight of a polyamide resin, and
   (C) 3–70 parts by weight, per 100 parts by weight of the polyphenylene ether resin and polyamide resin combined, of a plate-like inorganic filler having an average particle size of no more than 5 μm and an aspect ration of no less than 3, and
   wherein the temperature difference between (i) the crystallization initiation temperature of a composition comprising 90 wt. % of the polyamide resin and 10 wt % of the inorganic filler and (ii) the crystallization initiation temperature of the polyamide resin is 5° C. or less; and wherein the polyphenylene ether resin and the polyamide resin are compatabilized.

13. A resin composition as recited in claim 12 wherein the polyphenylene ether resin end groups have been modified to react with amino groups.

14. A resin composition as recited in claim 13 wherein the PPE end groups have been modified to end groups selected from the groups consisting of epoxy groups, carboxyl groups and acid anhydrides.

15. A resin composition as recited in claim 12 wherein the polyphenylene ether resin and polyamide resin are compatabilized with a compatibilizing agent.

16. A resin composition as recited in claim 15 wherein the compatibilizing agent is selected from the group consisting unsaturated carboxylic acids, unsaturated carboxylic acid derivation, saturated aliphatic polycarboxylic acids, saturated aliphatic polycarboxylic acid derivatives and mixtures thereof.

17. A resin composition as recited in claim 1 further comprising additives selected from the group consisting of impact modifiers, lubricants, antioxidants, weather-resistance enhancers, colorants, flame retardants, antistatic agents and mixtures thereof.

18. A resin composition as recited in claim 12 further comprising additives selected from the group consisting of impact modifiers, lubricants, antioxidants, weather-resistance enhancers, colorants, flame retardants, antistatic agents and mixtures thereof.

19. Articles of manufacture made from the resin composition recited in claim 1.

20. Articles of manufacture made from the resin composition recited in claim 12.

21. A resin composition consisting essentially of
   (A) 10–80 parts by weight of a polyphenylene ether resin,
   (B) 90–20 parts by weight of a polyamide resin, and
   (C) 3–70 parts by weight, per 100 parts by weight of the polyphenylene ether resin and polyamide resin combined, of a plate-like inorganic filler having an average particle size of no more than 5 μm and an aspect ration of no less than 3, wherein the temperature difference between (i) the crystallization initiation temperature of a composition comprising 90 wt. % of the polyamide resin and 10 wt % of the inorganic filler and (ii) the crystallization initiation temperature of the polyamide resin is 5° C. or less.

22. A resin composition consisting essentially of
 (A) 10–80 parts by weight of a polyphenylene ether resin,
 (B) 90–20 parts by weight of a polyamide resin, and
 (C) 3–70 parts by weight, per 100 parts by weight of the polyphenylene ether resin and polyamide resin combined, of a plate-like inorganic filler having an average particle size of no more than 5 μm and an aspect ration of no less than 3, wherein the temperature difference between (i) the crystallization initiation temperature of a composition comprising 90 wt. % of the polyamide resin and 10 wt % of the inorganic filler and (ii) the crystallization initiation temperature of the polyamide resin is 5° C. or less; and wherein the polyphenylene ether resin and the polyamide resin are compatabilized.

* * * * *